United States Patent
Oh et al.

(10) Patent No.: US 11,412,317 B2
(45) Date of Patent: Aug. 9, 2022

(54) METHOD AND APPARATUS FOR ALLOCATING BANDWIDTH BASED ON MACHINE LEARNING IN PASSIVE OPTICAL NETWORK

(71) Applicant: ELECTRONICS AND TELECOMMUNICATIONS RESEARCH INSTITUTE, Daejeon (KR)

(72) Inventors: Jung-yeol Oh, Sejong-si (KR); Kyeong Hwan Doo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 912 days.

(21) Appl. No.: 16/207,300

(22) Filed: Dec. 3, 2018

(65) Prior Publication Data
US 2020/0092622 A1    Mar. 19, 2020

(30) Foreign Application Priority Data
Sep. 19, 2018    (KR) .................. 10-2018-0111892

(51) Int. Cl.
*H04Q 11/00* (2006.01)
*H04B 10/27* (2013.01)
(Continued)

(52) U.S. Cl.
CPC .......... *H04Q 11/0067* (2013.01); *G06N 5/04* (2013.01); *G06N 20/00* (2019.01);
(Continued)

(58) Field of Classification Search
CPC ....... H04Q 11/0067; H04Q 2011/0084; H04Q 2011/0086; H04Q 2213/056; G06N 20/00;
(Continued)

(56) References Cited

U.S. PATENT DOCUMENTS

2006/0120724 A1* 6/2006 Ishimura ............ H04Q 11/0067
                                                                  398/75
2010/0254707 A1    10/2010 Peng et al.
(Continued)

FOREIGN PATENT DOCUMENTS

| JP | 2008219824 A | 9/2008 |
|---|---|---|
| JP | 2014017639 A | 1/2014 |
| JP | 5822857 B2 | 11/2015 |

OTHER PUBLICATIONS

Takayuki Kobayashi et al., "Bandwidth Allocation scheme based on Simple Statistical Traffic Analysis for TDM-PON based Mobile Fronthaul", OFC 2016, Optical Society of America.

*Primary Examiner* — Mewale A Ambaye
(74) *Attorney, Agent, or Firm* — LRK Patent Law Firm

(57) ABSTRACT

A method and apparatus for allocating a bandwidth based on machine learning in a passive optical network, the method including generating an inference model to predict a consumed bandwidth required for transmission by learning unstructured data of a PON including an OLT and traffic data corresponding to state information of the PON collected from the PON, predicting a consumed bandwidth with respect to a queue corresponding to a class requiring a low-latency service among classes of ONUS connected to the OLT based on the generated inference model, performing a VBA with respect to the queue corresponding to the class requiring the low-latency service based on the predicted consumed bandwidth, and performing a DBA with respect to a queue corresponding to a class not requiring the
(Continued)

low-latency service using a transmission bandwidth which remains after the VBA is performed.

18 Claims, 18 Drawing Sheets

(51) Int. Cl.
| | |
|---|---|
| *H04B 10/079* | (2013.01) |
| *G06N 20/00* | (2019.01) |
| *G06N 5/04* | (2006.01) |
| *H04L 41/5022* | (2022.01) |
| *H04L 47/80* | (2022.01) |
| *H04L 47/6275* | (2022.01) |
| *G06N 3/08* | (2006.01) |
| *G06N 3/04* | (2006.01) |

(52) U.S. Cl.
CPC ......... *H04B 10/0795* (2013.01); *H04B 10/27* (2013.01); *H04L 41/5022* (2013.01); *H04L 47/6275* (2013.01); *H04L 47/808* (2013.01); *G06N 3/04* (2013.01); *G06N 3/084* (2013.01); *H04Q 2011/0084* (2013.01); *H04Q 2011/0086* (2013.01); *H04Q 2213/056* (2013.01)

(58) Field of Classification Search
CPC . G06N 5/04; G06N 5/00; H04B 10/27; H04B 10/0795; H04B 10/11; H04L 41/5022; H04L 47/808
See application file for complete search history.

(56) References Cited

U.S. PATENT DOCUMENTS

| | | | |
|---|---|---|---|
| 2011/0129223 | A1 | 6/2011 | Yoo et al. |
| 2012/0014341 | A1 | 1/2012 | Cai et al. |
| 2016/0277142 | A1 | 9/2016 | Doo et al. |
| 2017/0187632 | A1 | 6/2017 | Ko et al. |
| 2018/0132304 | A1* | 5/2018 | Lee ........................ H04W 76/30 |
| 2019/0037461 | A1* | 1/2019 | Li .......................... H04W 76/23 |
| 2019/0215685 | A1* | 7/2019 | Wang .................... H04W 80/08 |
| 2020/0014992 | A1* | 1/2020 | Chung ............... H04Q 11/0067 |
| 2020/0229205 | A1* | 7/2020 | Bharadwaj ............ H04W 72/02 |
| 2020/0351959 | A1* | 11/2020 | Lee ........................ H04L 1/1819 |
| 2021/0219283 | A1* | 7/2021 | Xue ...................... H04W 28/26 |

* cited by examiner

|   | day | 5 | 6 | 7 | 8 | 9 | ... | 19 | 20 | 21 | 23 | 24 |
|---|---|---|---|---|---|---|---|---|---|---|---|---|
| 0 | 7 | 470 | 286 | 397 | 786 | 1421 | ... | 3384 | 2537 | 3914 | 917 | 112 |
| 1 | 1 | 411 | 536 | 2297 | 3665 | 2103 | ... | 4883 | 3580 | 3606 | 1094 | 188 |
| 2 | 2 | 417 | 491 | 1557 | 3135 | 1950 | ... | 5006 | 3417 | 3453 | 1057 | 167 |
| 3 | 3 | 391 | 543 | 1582 | 2952 | 2071 | ... | 4832 | 3436 | 3240 | 1111 | 185 |
| 4 | 4 | 456 | 508 | 1548 | 3092 | 2250 | ... | 5018 | 3538 | 3806 | 1200 | 170 |

FIG. 11

| ONU1 | RTT | Class | BA | Cycle | Credit |
|------|-----|-------|-----|-------|--------|
| ONU1 | 10 | Class1 | VBA | 1000 | 230 |
| ONU2 | 5 | Class2 | DBA | · | 300 |
| ... | ... | ... | ... | · | ... |
| ONUn | 3.5 | Classn | DBA | · | 300 |

METHOD AND APPARATUS FOR ALLOCATING BANDWIDTH BASED ON MACHINE LEARNING IN PASSIVE OPTICAL NETWORK

CROSS-REFERENCE TO RELATED APPLICATION(S)

This application claims the benefit of Korean Patent Application No. 10-2018-0111892, filed on Sep. 19, 2018, in the Korean Intellectual Property Office, the disclosure of which is incorporated herein by reference.

BACKGROUND

1. Field of the Invention

One or more example embodiments relate to a method and apparatus for allocating a bandwidth based on machine learning in a passive optical network (PON) and, more particularly, to a method and apparatus that may predict a quantity of traffic data of a network node using machine learning in a PON and flexibly allocate a consumed bandwidth, thereby increasing a network efficiency and supporting a low-latency characteristic.

2. Description of Related Art

A PON refers to a network between a central office and a subscriber, wherein at least one optical network unit (ONU) is connected to a single optical line terminal (OLT) in a 1:N structure. The PON is established to provide a high-speed internet service in a house, an apartment, or a building. However, a range of application of the PON is expanding to a backhaul and fronthaul of a mobile network based on a price competitiveness.

To accommodate a 5G service including a future large-capacity super-realistic service in the PON, the 5D service should meet speed and low-latency requirements. Such a service requires a latency of 0.1 to 1 ms including a wired and wireless transmission period although it may differ according to standards. A latency characteristic in the PON refers to a time from a timepoint at which a packet is input into an ONU of a subscriber to a timepoint at which the packet is output to a core network through the OLT. In the PON, downstream uses broadcasting, and thus a latency characteristic thereof is not great. Conversely, upstream uses time division multiplexing (TDM), and thus a latency characteristic thereof increases based on the number of ONUs and a traffic quantity. Accordingly, when the number of ONUs and the traffic quantity are used restrictively, the latency characteristic may be lowered, which, however, leads to a decrease in network utilization rate and an increase in cost.

SUMMARY

An aspect provides a method that may generate an inference model to predict a consumed bandwidth required for transmission by learning unstructured data and traffic data of a passive optical network (PON) using a plurality of machine learning models.

Another aspect also provides a method and apparatus that may perform a variable bandwidth allocation (VBA) with respect to a queue corresponding to a class requiring a low-latency service and perform a dynamic bandwidth allocation (DBA) with respect to a queue corresponding to a class not requiring the low-latency service using a transmission bandwidth which remains after the VBA is performed, thereby guaranteeing a low-latency requirement and increasing a network utilization rate.

According to an aspect, there is provided a bandwidth allocating method including generating an inference model to predict a consumed bandwidth required for transmission by learning, using a plurality of machine learning models, unstructured data of a PON including an optical line terminal (OLT) and traffic data corresponding to state information of the PON collected from the PON, predicting a consumed bandwidth with respect to a queue corresponding to a class requiring a low-latency service among classes of optical network units (ONUs) connected to the OLT based on the generated inference model, performing a VBA with respect to the queue corresponding to the class requiring the low-latency service among the classes of the ONUs based on the predicted consumed bandwidth, and performing a DBA with respect to a queue corresponding to a class not requiring the low-latency service among the classes of the ONUs using a transmission bandwidth which remains after the VBA is performed.

The generating may include learning training data using the machine learning models, extracting a predetermined pattern using the learned training data, and generating an inference model to predict a consumed bandwidth with respect to a queue of an ONU requiring the low-latency service among the ONUs connected to the OLT based on the extracted predetermined pattern.

The predicting may include predicting traffic data with respect to a queue of an ONU requiring the low-latency service based on the generated inference model, determining a consumed bandwidth with respect to the queue corresponding to the class requiring the low-latency service of the ONU based on a quantity of the predicted traffic data, and calculating a prediction accuracy of the inference model through a cross validation with respect to the determined consumed bandwidth, wherein the generating may include updating the inference model based on the calculated prediction accuracy.

The bandwidth allocating method may further include calculating a variable bandwidth with respect to the queue corresponding to the class requiring the low-latency service based on the predicted consumed bandwidth.

The performing of the VBA may include allocating a transmission bandwidth with respect to the queue corresponding to the class requiring the low-latency service based on the calculated variable bandwidth such that a total of the transmission bandwidth allocated based on the calculated variable bandwidth may be determined not to exceed a transmission bandwidth allocable according to a cycle time.

The performing of the DBA may include allocating a dynamic bandwidth with respect to the queue corresponding to the class not requiring the low-latency service based on report messages received from the ONUs, wherein the allocated dynamic bandwidth may be determined based on the transmission bandwidth allocable according to the cycle time.

The performing of the DBA may include, when a dynamic bandwidth determined with respect to one of queues to which the dynamic bandwidth is allocated through the DBA exceeds the bandwidth allocable according to the cycle time, dividing the determined dynamic bandwidth based on an end timepoint of the allocable bandwidth and determining a dynamic bandwidth before the end timepoint to be a transmission bandwidth with respect to the one queue, wherein a residual bandwidth after the end timepoint may be processed in a bandwidth allocable according to a cycle time of a subsequent period.

According to another aspect, there is provided a bandwidth allocating apparatus including a machine learning inferrer configured to generate an inference model to predict a consumed bandwidth required for transmission by learning, using a plurality of machine learning models, unstructured data of a PON including an OLT and traffic data corresponding to state information of the PON collected from the PON, and predict a consumed bandwidth with respect to a queue corresponding to a class requiring a low-latency service among classes of ONUS connected to the OLT based on the generated inference model, and a bandwidth allocator configured to perform a VBA with respect to a queue corresponding to a class requiring the low-latency service based on the predicted consumed bandwidth, and perform a DBA with respect to a queue corresponding to a class not requiring the low-latency service among the classes of the ONUs using a transmission bandwidth which remains after the VBA is performed.

The machine learning inferrer may be configured to learn training data using the machine learning models, extract a predetermined pattern using the learned training data, and generate an inference model to predict a consumed bandwidth with respect to a queue corresponding to the class requiring the low-latency service of a predetermined node among the ONUs connected to the OLT based on the extracted predetermined pattern.

The machine learning inferrer may be configured to predict traffic data with respect to a queue of an ONU requiring the low-latency service based on the generated inference model, determine a consumed bandwidth with respect to the service queue corresponding to the class requiring the low-latency service among the ONUS based on a quantity of the predicted traffic data, calculate a prediction accuracy of the inference model through a cross validation with respect to the determined consumed bandwidth, and update the inference model based on the calculated prediction accuracy.

The bandwidth allocating apparatus may further include a service level agreement (SLA) manager configured to calculate a variable bandwidth with respect to the queue corresponding to the class requiring the low-latency service among the classes of the ONUs based on the predicted consumed bandwidth.

The bandwidth allocator may be configured to allocate a transmission bandwidth with respect to the queue corresponding to the class requiring the low-latency service based on the calculated variable bandwidth such that a total of the transmission bandwidth allocated based on the calculated variable bandwidth may be determined not to exceed a transmission bandwidth allocable according to a cycle time.

The bandwidth allocator may be configured to allocate a dynamic bandwidth with respect to the queue corresponding to the class not requiring the low-latency service based on report messages received from the ONUS, wherein the allocated dynamic bandwidth is determined based on the transmission bandwidth allocable according to the cycle time.

The bandwidth allocator may be configured to, when a dynamic bandwidth determined with respect to one of queues to which the dynamic bandwidth is allocated through the DBA exceeds the bandwidth allocable according to the cycle time, divide the determined dynamic bandwidth based on an end timepoint of the allocable bandwidth and determine a dynamic bandwidth before the end timepoint to be a transmission bandwidth with respect to the one queue, wherein a residual bandwidth after the end timepoint may be processed in a bandwidth allocable according to a cycle time of a subsequent period.

According to still another aspect, there is provided a bandwidth allocating method including storing uplink data for each of different queues for services having priorities, transmitting a report message requesting a bandwidth allocation to an OLT based on the stored uplink data, receiving a grant message including a transmission bandwidth allocated based on the transmitted report message, and transmitting the stored uplink data based on the received grant message, wherein the grant message including a transmission bandwidth allocated by performing a VBA with respect to queues corresponding to a class requiring a low-latency service within a bandwidth allocable according to a cycle time, and performing a DBA with respect to queues corresponding to a class not requiring the low-latency service.

A variable bandwidth may be allocated through the VBA with respect to each of the queues corresponding to the class requiring the low-latency service such that a total of the allocated variable bandwidth may be determined not to exceed a bandwidth allocable according to a cycle time.

A dynamic bandwidth may be allocated through the DBA with respect to each of the queues corresponding to the class not requiring the low-latency service, wherein the allocated dynamic bandwidth is determined based on the bandwidth allocable according to the cycle time.

When a dynamic bandwidth determined with respect to one of queues to which the dynamic bandwidth is allocated through the DBA exceeds the bandwidth allocable according to the cycle time, the determined dynamic bandwidth may be divided based on an end timepoint of the allocable bandwidth, and a dynamic bandwidth before the end timepoint may be determined to be a transmission bandwidth with respect to the one queue, wherein a residual bandwidth after the end timepoint may be processed in a bandwidth allocable according to a cycle time of a subsequent period According to further another aspect, there is provided a bandwidth allocating apparatus including a memory configured to store uplink data for each of different queues for services having priorities, and a processor configured to process the uplink data stored in the memory, wherein the processor may be configured to transmit a report message requesting a bandwidth allocation to an OLT based on the stored uplink data, receive a grant message including a transmission bandwidth allocated based on the transmitted report message, and transmit the stored uplink data based on the received grant message, wherein the grant message may include a transmission bandwidth allocated by performing a VBA with respect to queues corresponding to a class requiring a low-latency service within a bandwidth allocable according to a cycle time, and performing a DBA with respect to queues corresponding to a class not requiring the low-latency service.

A variable bandwidth may be allocated through the VBA with respect to each of the queues corresponding to the class requiring the low-latency service such that a total of the allocated variable bandwidth may be determined not to exceed a bandwidth allocable according to a cycle time, and a dynamic bandwidth may be allocated through the DBA with respect to each of the queues corresponding to the class not requiring the low-latency service, wherein the allocated dynamic bandwidth may be determined based on the bandwidth allocable according to the cycle time.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 10A through 10D illustrate results of predicting a consumed bandwidth using a machine learning model using a multiple linear regression model having an artificial neural network structure according to an example embodiment;

FIG. 11 illustrates an example of a setting table of a service level agreement (SLA) manager according to an example embodiment;

DETAILED DESCRIPTION

Figure 1:
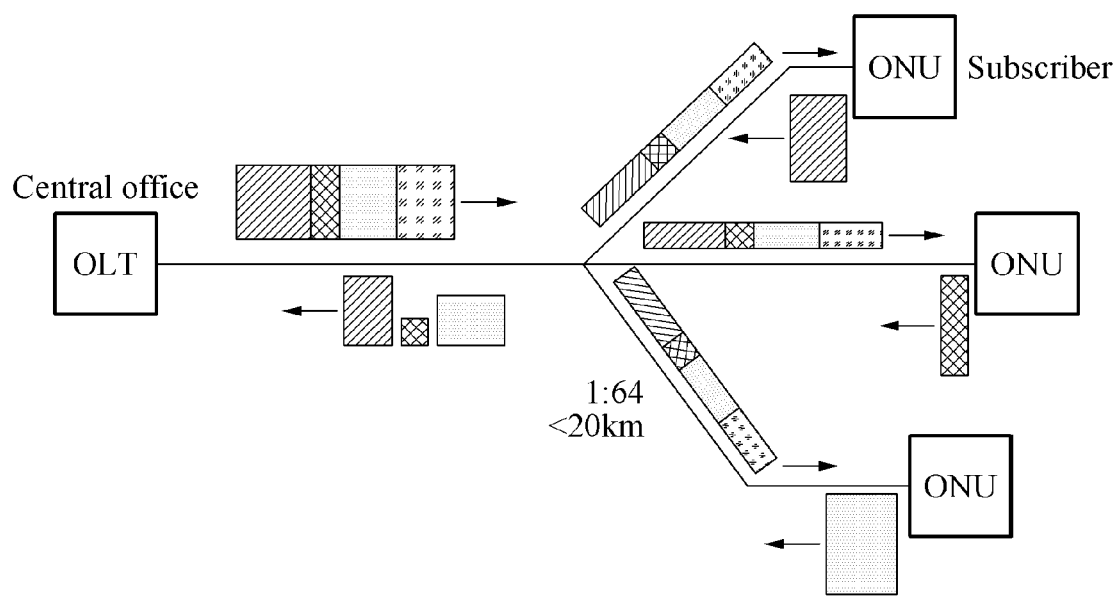
FIG. 1 is a diagram illustrating a data transmission structure in a passive optical network (PON) according to an example embodiment.

Hereinafter, some example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 is a diagram illustrating a data transmission structure in a passive optical network (PON) according to an example embodiment.

A PON refers to an optical network technology that provides a high-speed data service by connecting an optical line terminal (OLT) to multiple optical network units (ONUs) through a point-to-multipoint (P2MP) network. As shown in FIG. 1, the PON has a tree structure in which the OLT positioned at a central office and multiple ONUs positioned at subscribers have a 1:N correspondence. For packet transmission, downstream from the OLT to the ONUs may use broadcasting, and, conversely, upstream from the ONUS to the OLT may use time division multiplexing (TDM) to avoid collisions between multiple ONUs.

Thus, the downstream may not have a great packet latency, but the upstream may show a great increase in packet delay depending on a quantity of traffic data and the number of ONUs. A packet latency in the PON which accommodates a mobile network may refer to a time consumed for packet transmission from a timepoint at which a packet is input into an ONU to a timepoint at which the packet is output to a core network through the OLT.

A bandwidth allocating scheme of the ONU for upstream in the PON may include a fixed bandwidth allocation (FBA) which allocates a predetermined transmission bandwidth irrespective of a quantity of traffic data of the ONU, and a dynamic bandwidth allocation (DBA) which allocates a transmission bandwidth based on the quantity of traffic data of the ONU.

The FBA is a non-status reporting (NSR) scheme which allocates a predefined transmission bandwidth without receiving buffer status information from the ONU. Conversely, the DBA uses a status reporting (SR) scheme in which the OLT receives a report on current buffer status information from multiple ONUs, and determines bandwidths to be allocated based on the report information received from the ONUs.

The FBA may not require a procedure to receive a report on current buffer statuses from the ONUs and thus, may greatly reduce a packet latency. However, when a quantity of traffic data used by the PON is small, a network utilization rate may decrease greatly. Conversely, the DBA differs from the FBA in that the DBA has a great packet latency when compared to the FBA but increases the network utilization rate.

Thus, in the existing PON having a relatively moderate requirement for the packet latency, the DBA exhibiting a relatively great network usage efficiency has been used. However, a next generation mobile communication service should meet a low-latency requirement for a super-realistic service in addition to a large volume of multimedia data. For example, the next generation mobile communication service requires a latency of 0.1 to 1 ms including a wired and wireless transmission period although it may differ depending on a service classification.

Figure 2:
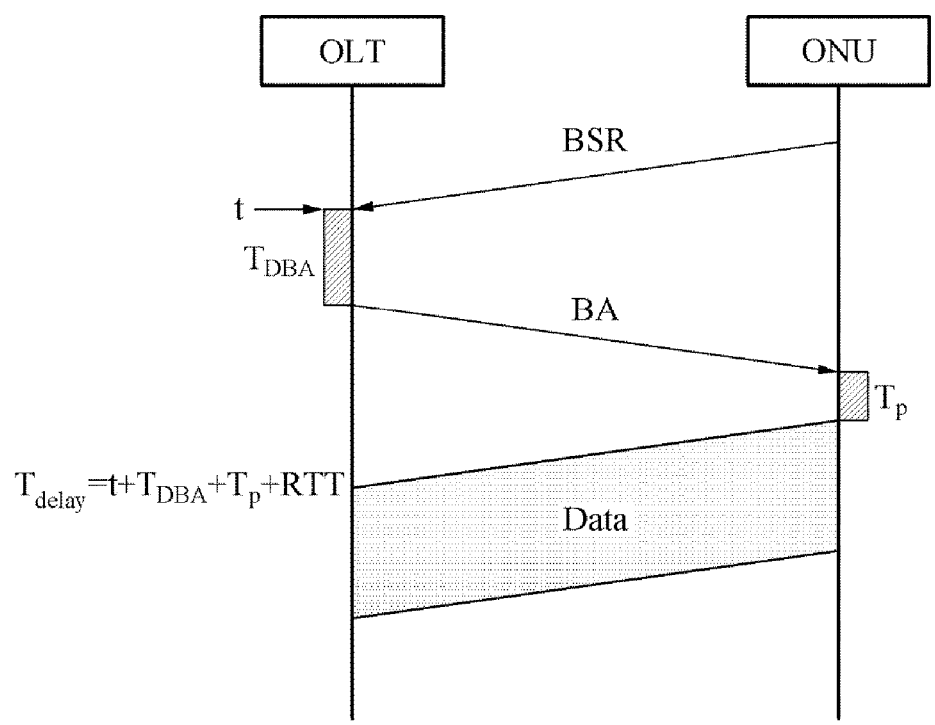
FIG. 2 is a diagram illustrating a minimum packet latency of a dynamic bandwidth allocation (DBA) according to an example embodiment.

FIG. 2 is a diagram illustrating a minimum packet latency of a DBA according to an example embodiment.

A delay in a PON may be principally caused by a fiber propagation delay and a buffer delay in an ONU occurring according to TDM. In this example, the fiber propagation delay may not be reduced. Thus, to improve the latency characteristic in the PON, the buffer delay in the ONU should be reduced. The buffer delay in the ONU may be caused by the following two factors in summary.

The first factor is shown in FIG. 2. When a packet is input into an ONU, the ONU may report a quantity of traffic data to be transmitted, the traffic data stored in a buffer, to an OLT through a report message (buffer status report (BSR)). The OLT may give a grant message having a allocated bandwidth and a transmission timepoint of the traffic data to the ONU in view of a bandwidth allocation calculation time $T_{DBA}$, a transmission time through an optical cable, that is, a round trip time (RTT), and an ONU preparation time $T_p$. Thereafter, the ONU may transmit uplink data corresponding to the allocated bandwidth at the transmission timepoint of the traffic data included in the grant message. Thus, a minimum buffer delay required for the ONU to store the traffic data in the buffer, from the timepoint at which the ONU reports the buffer status to the OLT through the report message to the transmission timepoint of the traffic data, may be determined to be $T_{DBA}+T_p+RTT$.

Figure 3:
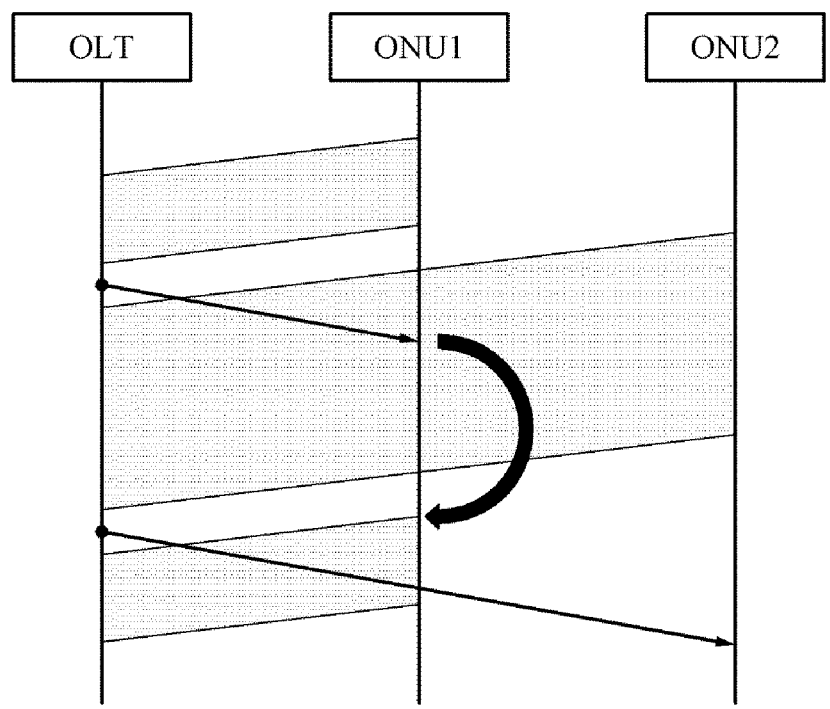
FIG. 3 is a diagram illustrating a packet delay with respect to a length of an optical network unit (ONU) transmission period according to an example embodiment.

FIG. 3 is a diagram illustrating a packet delay with respect to a length of an ONU transmission period according to an example embodiment.

The second factor is a length of a data transmission period, that is, a burst size, of the ONU. The allocated bandwidth which is allowed for the ONU may be determined through the BA (bandwidth allocation). In this case, as the size of traffic data to be transmitted increases, an interval for the ONUs to perform the BA (bandwidth allocation) may increase, and thus the buffer delay may increase.

For example, as shown in FIG. 3, if a quantity of traffic data transmitted by an ONU2 is relatively great, a transmission start time of an ONU1 may be delayed until the transmission of the ONU2 is completed, and thus a buffer delay of the ONU1 may increase as much. To improve a packet latency, an interval of the BA may be significant. In this example, a time from a transmission start time to a subsequent transmission start time for the same ONU may be referred to as a cycle time. When assuming that a bandwidth is allocated to every ONU one time within a single cycle, a sum of transmission bandwidths allocated to all ONUS may be controlled not to exceed a predetermined time satisfying the packet latency.

However, the cycle time may not be reduced blindly to reduce the packet latency. That is because a traffic throughput may decrease due to an increase in redundancy as the cycle time decreases since a guard time is necessarily required for a burst transmission of the ONU and a burst reception of the OLT. The guard time may include a laser turn-on, a layer turn-off, and a sync time required for clock restoration. Irrespective of a valid data transmission length, a guard time of 1 to 2 μs may be required for every burst.

For example, it may be assumed that there are "64" ONUs, the cycle time is 2 ms, and the guard time is 2 μs, a maximum available time per ONU may be 31.2 μs, and an actual valid data transmission time may be 29.2 μs. However, when the cycle time is lowered to 0.5 ms to reduce the packet latency, the maximum available time per ONU may be 7.8 μs, and the actual data transmission time may be 5.8 μs. Here, if a value obtained by dividing the actual data transmission time by the maximum available time per ONU is considered as a transmission efficiency, the transmission efficiency for the cycle time of 2 ms may be 0.93, whereas the transmission efficiency for the cycle time of 0.5 ms may be greatly reduced to 0.74. Thus, when the cycle time is reduced to reduce the packet latency, the traffic throughput may decrease at the same time.

Figure 4:
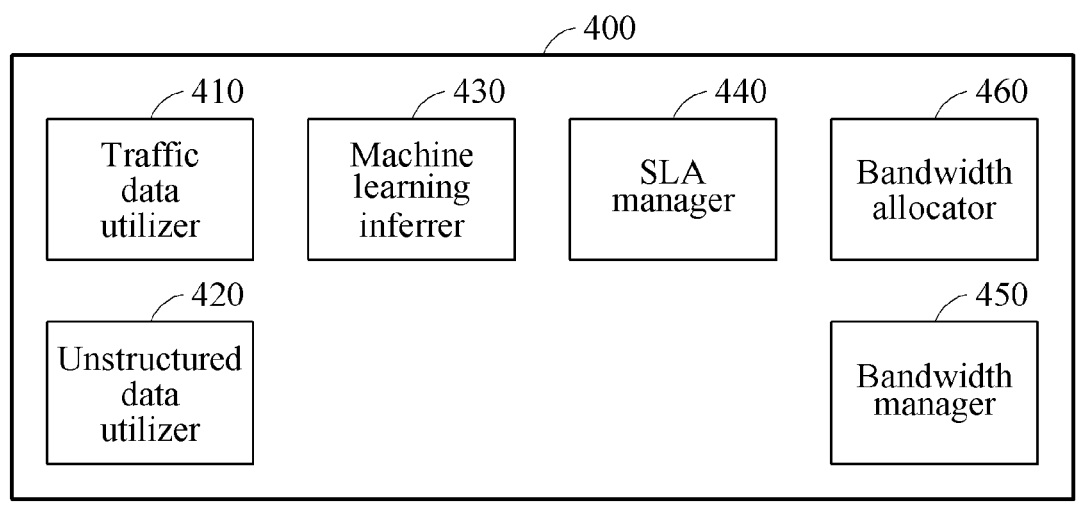
FIG. 4 is a block diagram illustrating a configuration of a machine learning based bandwidth allocating apparatus according to an example embodiment.

FIG. 4 is a block diagram illustrating a configuration of a machine learning based bandwidth allocating apparatus according to an example embodiment.

An ONU which is applied to a backhaul and a fronthaul of a mobile network should meet the low-latency requirements according to standards. In an example in which an ONU requiring a low-latency service depending on a purpose of use and an ONU not requiring the low-latency service coexist in a single PON, a bandwidth allocator included in the same OLT may need to manage the ONUs. The ONUS may be distinguished based on installation sites of the corresponding ONUs or types of services provided by the corresponding ONUS, and an SLA (service level agreement) table of the OLT may be set based on the same to limit speeds and properties of the services provided to the corresponding ONUS.

An ONU installed at a location of a subscriber requiring a business service or a mobile communication base station may correspond to the ONU requiring the low-latency service. Thus, the SLA table may include whether a queue for each service having a priority is used for each ONU, and a maximum service speed for each service having a priority.

For example, it may be assumed that all ONUs can support four service queues Q1, Q2, Q3, and Q4, wherein Q1 is designed to operate through a VBA for the low-latency service, and the remaining Q2 through Q4 are designed to operate through a DBA for a service not requiring the low-latency service. In this example, if it is desired that an ONU_A uses Q1 as an ONU requiring the low-latency service and uses Q4 otherwise, and an ONU_B uses Q2, Q3, and Q4 otherwise, bandwidths may be allocated only to credit-assigned classes in bandwidth allocation by assigning credits only to the support classes Q1 and Q4 of the ONU_A and assigning credits only to Q2, Q3, and Q4 for the ONU_B in the SLA table. In this example, the Q1 class may operate through the VBA, and Q2, Q3, and Q4 may operate through the DBA.

That is, ONUs to which a bandwidth allocating method according to example embodiments is applied may include an ONU having a class requiring the low-latency service, an ONU having a class not requiring the low-latency service, and an ONU having both the class requiring the low-latency service and the class not requiring the low-latency service.

The bandwidth allocating method relates to a method of guaranteeing a latency characteristic and a transmission bandwidth by first allocating a variable bandwidth to an ONU requiring a low-latency service through machine learning, and allocating a dynamic bandwidth to an ONU not requiring the low-latency service using a transmission bandwidth which remains after the variable bandwidth is allocated.

A bandwidth allocating apparatus 400 may include a traffic data utilizer 410, an unstructured data utilizer 420, a machine learning inferrer 430, an SLA manager 440, a bandwidth manager 450, and a bandwidth allocator 460.

In detail, the bandwidth allocating apparatus 400 may generate an inference model to predict a consumed bandwidth required for transmission by learning unstructured data and traffic data using a plurality of machine learning models. The bandwidth allocating apparatus 400 may predict a consumed bandwidth with respect to a class requiring a low-latency service among ONUs connected to an OLT based on the generated inference model, and perform a VBA with respect to a queue corresponding to the class requiring the low-latency service based on the predicted consumed bandwidth.

The bandwidth allocating apparatus 400 may perform a DBA with respect to a queue corresponding to a class not requiring the low-latency service among classes of the ONUs by using a transmission bandwidth which remains after the VBA is performed, thereby satisfying a low-latency characteristic required by a mobile network and improving the efficiency of the network.

Figure 5:
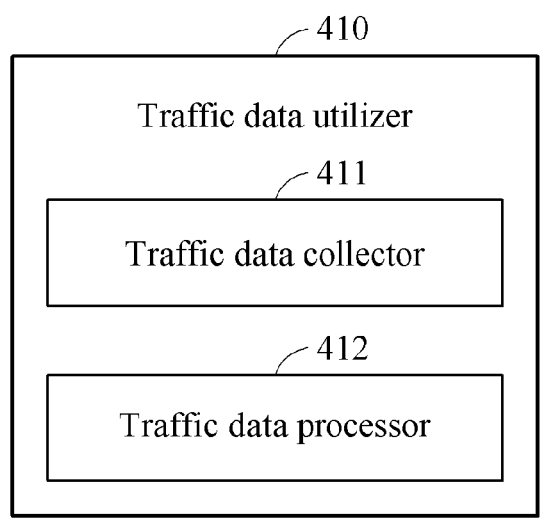
FIG. 5 is a block diagram illustrating a configuration of a traffic data utilizer according to an example embodiment.

FIG. 5 is a block diagram illustrating a configuration of a traffic data utilizer according to an example embodiment.

Referring to FIG. 5, the traffic data utilizer 410 may include a traffic data collector 411 and a traffic data processor 412. Traffic data collected by the traffic data collector 411 may refer to a traffic throughput aggregated for each unit time with respect to a service class of a corresponding node. In this example, the traffic data may also include traffic statistic data related to a packet drop rate, a packet jitter, a packet latency, a variance of traffic quantity, and an average throughput and standard deviation. Here, the average throughput and standard deviation may be an average traffic processing rate and standard deviation with respect to a time, and the packet latency may be a time consumed for packet transmission, the time including a buffer delay from a packet reception to a packet transmission and a message transmission time through an optical cable. Further, the packet jitter may be a standard deviation with respect to the latency, and the packet drop rate may refer to an amount of packet dropped at the buffer without being transmitted. In this example, the traffic throughput may have a close relationship with an allocated transmission bandwidth, and the packet latency, the packet jitter, and the packet drop rate may be used for evaluation of the predicted consumed bandwidth. The traffic data collector 411 may store the collected traffic data as shown in Table 1.

machine learning algorithm through preprocessing operations such as binarization, average removal, scaling, normalization, and label encoding. Here, the binarization may be a technique of converting a number into a boolean data type, and the average removal may be a technique of removing an average size such that values of feature vectors are distributed around "0". Further, the scaling may be a process of performing a size adjustment using a predetermined criterion such that a range of a feature vector value is uniform, and the normalization may be a process of normalizing a value of a feature vector based on a predetermined criterion. In addition, the label encoding may be a process of converting a label represented in letters into numbers so as to be processed by a machine learning function. For example, a "day" may be converted into numbers through the label encoding.

Figure 6:
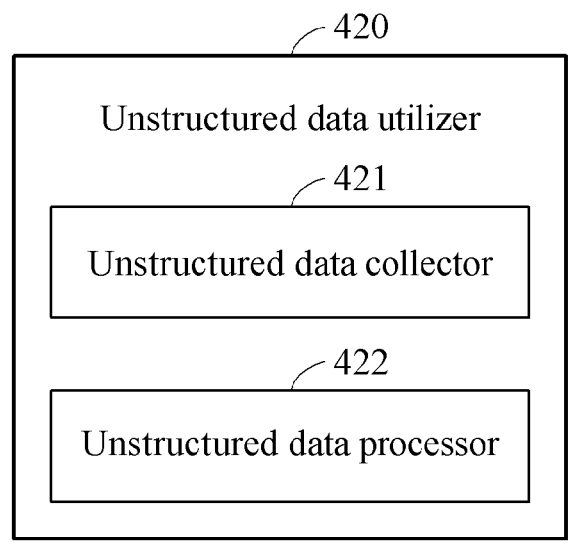
FIG. 6 is a block diagram illustrating a configuration of an unstructured data utilizer according to an example embodiment.

FIG. 6 is a block diagram illustrating a configuration of an unstructured data utilizer according to an example embodiment.

Referring to FIG. 6, the unstructured data utilizer 420 may include an unstructured data collector 421 and an unstructured data processor 422. The unstructured data collector 421 may collect unstructured data or semi-structured data with respect to a network node of a PON. For example, the unstructured data utilizer 420 may extract desired semi-structured data, that is, predetermined information such as events and temperature, from attribute data including a schema and metadata with respect to web data of a hypertext markup language (HTML) or an extensible mark-up language (XML) using a method of analyzing news, events, and weather through a social network analysis. Further, the unstructured data utilizer 420 may extract desired predetermined information through natural language processing of unstructured data not stored in a fixed field.

For this, the unstructured data may be collected through text mining, opinion mining, or a cluster analysis. Here, the text mining may be a technology of extracting and processing useful information from unstructured text data or semi-structured text data based on natural language processing. For example, the text mining may collect unstructured data from a variety of big data generated in a corresponding area, for example, the weather, and events such as sports or festivals of the area.

The opinion mining may be a technology of collecting unstructured data by analyzing opinions about a service or a product of a corresponding area from social media services such as blogs, social network services (SNS), and user created content (UCC).

The unstructured data processor 422 may convert the unstructured data collected by the unstructured data collector 421 into a data format that can be processed by the

TABLE 1

| Date | Day | 05 | 06 | 07 | 08 | ... | 22 | 23 | 24 | Delay | Jitter | Drop |
|------|-----|-----|-----|------|------|-----|------|------|-----|-------|--------|------|
| 05.04 | Sun | 470 | 286 | 397 | 786 | | 2660 | 917 | 112 | 255 | 10 | 0.01 |
| 05.05 | Mon | 411 | 536 | 2297 | 3665 | | 1986 | 1094 | 188 | 257 | 11 | 0.03 |
| 05.06 | Tue | 417 | 491 | 1557 | 3135 | | 2080 | 1057 | 167 | 300 | 25 | 0.12 |
| ... | ... | ... | ... | ... | ... | ... | ... | ... | ... | ... | ... | ... |
| 05.30 | Fri | 456 | 508 | 1548 | 3092 | ... | 2156 | 1200 | 170 | 250 | 15 | 0.02 |

The traffic data processor 412 may convert the traffic data collected by the traffic data collector 411 into a data format that can be processed by a machine learning algorithm. In this example, the traffic data processor 412 may convert the traffic data into the data format that can be processed by the machine learning algorithm. In this example, the unstructured data processor 422 may convert the unstructured data into the data format that can be processed by the machine learning algorithm through preprocessing operations such as binarization, average removal, scaling, normalization, and label encoding. The preprocessing operations may be performed by performing operations such as binarization, average removal, scaling, normalization, and label encoding.

The unstructured data utilizer 420 may be selectively employed or not be employed depending on a configuration. If a sufficient bandwidth prediction performance can be achieved using only the traffic data utilizer 410, the configuration may include only the traffic data utilizer 410.

Figure 7:
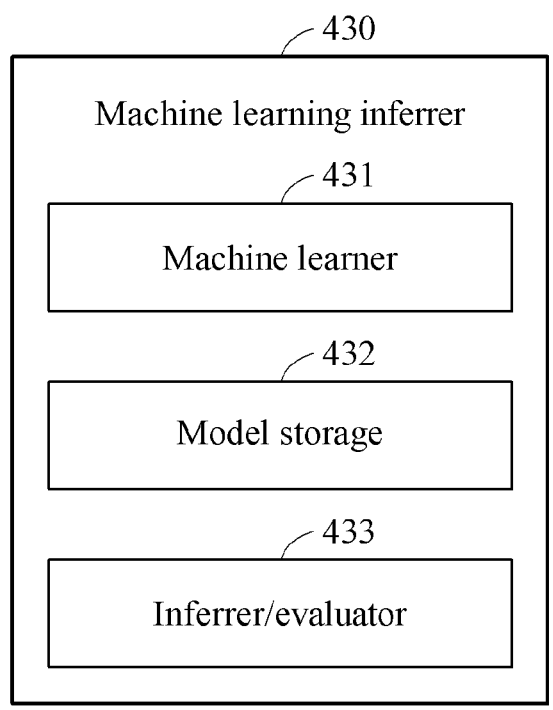
FIG. 7 is a block diagram illustrating a configuration of a machine learning inferrer according to an example embodiment.

FIG. 7 is a block diagram illustrating a configuration of a machine learning inferrer according to an example embodiment.

A machine learning model may generate an inference model by learning data, without a necessity for directly generating an equation to represent data. That is, the machine learning model may define labels with respect to many input values, and arrange and learn output values with respect to the labels. For example, the machine learning model may generate a system for predicting a consumed bandwidth by arranging used bandwidths using parameters based on various information related to an area, such as time, date, season, weekday or weekend, local events, and opinions of social media, and performing machine learning with respect to the same.

Referring to FIG. 7, the machine learning inferrer 430 may include a machine learner 431, a model storage 432, and an inferrer/evaluator 433. First, the machine learner 431 may receive unstructured data and traffic data collected by the traffic data utilizer 410 and the unstructured data utilizer 420 and perform machine learning. In this example, the machine learning may include supervised learning, unsupervised learning, and reinforcement learning.

First, supervised learning may provide a method of performing learning in a state in which labeled data is provided as a correct answer. The machine learner 431 may learn a consumed bandwidth by utilizing the traffic data of the network, and weather, day, and time information provided by the traffic data utilizer 410 through supervised learning. Further, the machine learner 431 may investigate users through a social network, events, and the weather of an area provided by the unstructured data utilizer 420, and learn the same by utilizing opinion mining from people, thereby predicting a more accurate consumed bandwidth.

When a training dataset is transmitted by defining relationships between an allocated bandwidth and multiple parameters such as traffic data with respect to a specific date and time, the machine learner 431 may learn a method of calculating a consumed bandwidth of a queue corresponding to a class requiring a low-latency service through a machine learning model.

In this example, the machine learning model principally used as a methodology of supervised learning may include a recurrent neural network (RNN), a convolutional neural network (CNN), and a feed-forward neural network (FNN) including an error back-propagation and a multilayer perceptron constituting an artificial neural network model used for deep learning, a support vector machine (SVM), a logistic regression, and a multiple linear regression. The machine learner 431 may select an optimal model depending on a learning process from the various machine learning models.

Unsupervised learning may provide a method of performing learning in a state in which a label does not explicitly provide a correct answer. Unsupervised learning may include, for example, a clustering algorithm which figures out a hidden pattern by grouping data into categories having similar characteristics when the data is distributed randomly.

Reinforcement learning may be a method of reinforcing learning by taking an action with respect to a provided state and obtaining a reward therefrom, wherein learning is reinforced through an evaluation with respect to a prediction based on a performance result of the packet drop rate, the packet jitter, the packet latency, and the traffic throughput collected from the traffic data utilizer 410 after the consumed bandwidth is predicted.

As described above, the machine learner 431 may generate inference models by learning training data using various machine learning models and extracting a pattern therefrom, select an optimal model from the generated inference models, and store the selected model in the model storage 432.

The inferrer/evaluator 433 may retrieve an inference model to be used from the inference models stored in the model storage 432, predict a consumed bandwidth required with respect to a current time, and evaluate a prediction performance of the used inference model. In detail, the inferrer/evaluator 433 may generate a test dataset which is a portion of the training data set, and calculate a prediction accuracy of the inference model by utilizing the generated dataset. The inferrer/evaluator 433 may update the machine learning model based on a calculated result. Then, the inferrer/evaluator 433 may select an inference model with the highest performance from inference models generated through the updated machine learning model, thereby improving the performance of predicting a consumed bandwidth.

Figure 8A:
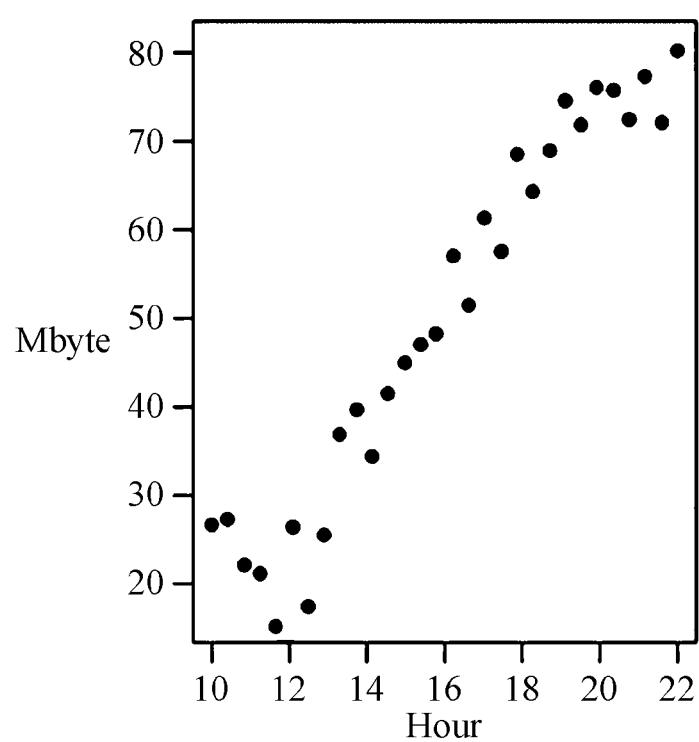
FIGS. 8A and 8B illustrate an example of a function of a traffic throughput and a consumed bandwidth with respect to a time according to an example embodiment.
Figure 8B:
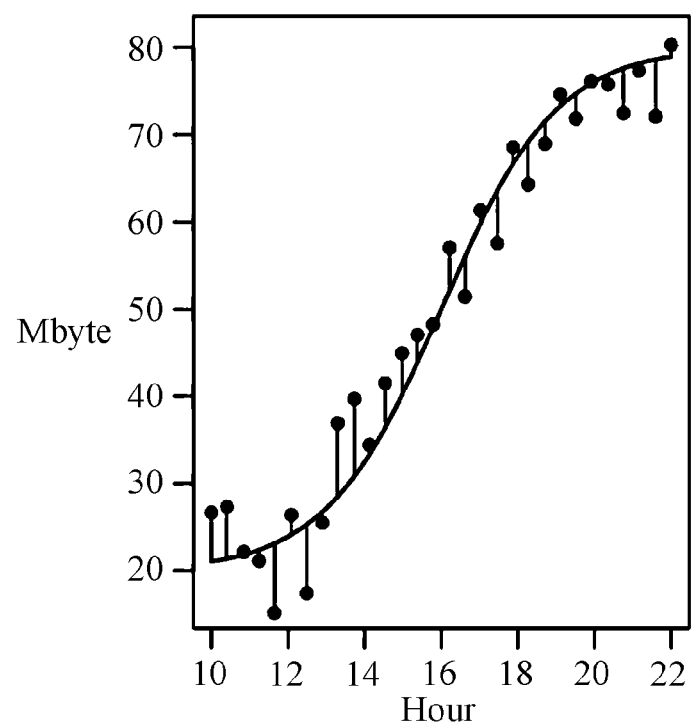

FIGS. 8A and 8B illustrate an example of a function of a traffic throughput and a consumed bandwidth with respect to a time according to an example embodiment.

The inferrer/evaluator 433 of the machine learning inferrer 430 may predict a consumed bandwidth and evaluate a performance through the following procedure. An actual function to predict a predetermined consumed bandwidth may be defined as $f$, as expressed by Equation 1.

$$f=f(x) \qquad \text{[Equation 1]}$$

Referring to FIG. 8A, an example of a throughput of traffic data with respect to a time is shown. This result may teach that a consumed bandwidth with respect to a time may be predicted as shown in FIG. 8B. A solid line denotes the function $f$, and a difference between each actual sample value and the function $f$ denotes an error. A training dataset may be expressed by Equation 2.

$$D=\{(x_1,t_1),(x_2,t_2),(x_N,t_N)\} \qquad \text{[Equation 2]}$$

Here, $t=f+\varepsilon$ may be satisfied, and samples may be generated in response to errors $\varepsilon$ occurring in the actual function $f$. In this example, t denotes an actual value which is affected by an actual error, and g denotes a desired prediction function. g(X) may be expressed as a predicted value when x is X, and Y=g(X) may be satisfied when a result of prediction is expressed as Y. An output result obtained through g may be y, which may be referred to as the predicted value. To evaluate a prediction effect, an average of mean squared errors (MSEs) with respect to the prediction result may be taken, as expressed by Equation 3.

$$E\{MSE\} = E\left\{\frac{1}{N}\sum_{i=1}^{N}(t_i - y_i)^2\right\} = \frac{1}{N}\sum_{i=1}^{N}E\{(t_i - y_i)^2\} \qquad \text{[Equation 3]}$$

An expected value of the MSE may be decomposed into a variance term of noise, a bias term of the predicted value, and a variance term of the predicted value, as expressed by Equation 4.

$$E\{(t_i-y_i)^2\}=\text{Var}\{\varepsilon\}+\text{bias}\{y_i\}^2+\text{Var}\{y_i\} \quad \text{[Equation 4]}$$

In this example, $\text{Var}\{\varepsilon\}=E\{\varepsilon^2\}$ may be satisfied, $\text{bias}\{y_i\}=E\{f_i-E\{y_i\}\}$ may be satisfied, and $\text{Var}\{y_i\}=E\{(E\{y_i\}-y_i)^2\}$ may be satisfied.

In this example, the variance term of noise may not be minimized and be irrelevant to a prediction model for optimization. The bias term of the predicted value may indicate a difference between $f(X)$ and $E\{g(X)\}$. That is, the bias term of the predicted value may indicate a mean of differences between the function $f$ and the function y in a state in which x=X is designated, which may indicate how much the predicted model accords with the actual function.

The variance term of the predicted value may indicate a difference between the predicted value g(X) and an average $E\{g(X)\}$ thereof, which is a distribution of the predicted model and indicates how well the predicted values converge to have similar values without being scattered irrespective of an actual operating value. That is, as a variance result increases, a prediction result may change greatly. Thus, to reduce the MSE, the bias term and the variance terms should be minimized.

However, the bias term may increase when the variance terms decrease, and the variance terms may increase when the bias term decreases. Thus, it is difficult to reduce the bias and the variance terms at the same time. To solve such an issue, a number of machine learning models may be provided, and in general, a machine learning model exhibiting the best performance with respect to the provided training dataset may be selected.

However, since the machine learning model selected as described above may be biased to the training data, the evaluation may be performed through a cross validation. The bias term may be an error which increases in a situation in which the machine learning model cannot describe the training data sufficiently. Such a situation may be referred to as an underfitting state. Conversely, the variance terms may be errors which increase in a situation in which the machine learning model describes training data excessively. Such a situation may be referred to as an overfitting state.

Figure 9:
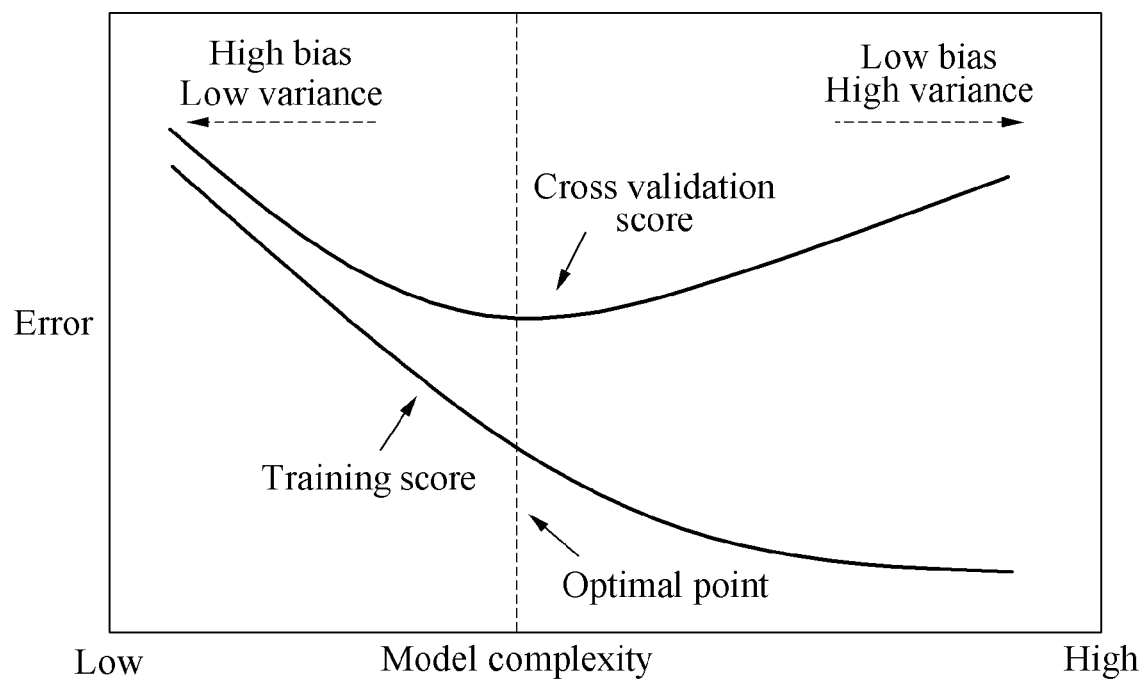
FIG. 9 illustrates an example of comparative curves of a training score and a cross validation score according to an example embodiment.

FIG. 9 illustrates an example of comparative curves of a training score and a cross validation score according to an example embodiment.

Referring to FIG. 9, characteristic of a training score and a cross validation score with respect to a training complexity of a machine learning model are shown. The training score may refer to a score when the machine learning model is tested with training data, and the cross validation score may be a validation method for estimating a general performance of the machine learning model, wherein validation is performed using separate test data, rather than using data used for training.

In detail, the cross validation method may include various methods such as a hold-out cross validation and a K-fold cross validation. The hold-out cross validation may divide a labeled training dataset into two parts, a training set and a test set, learn the training set using a machine learning model, and predict a label of the test set.

The K-fold cross validation may perform a cross validation on training and validation operations continuously. The term "K-fold" indicates that the validation is iterated k times. As the machine learning is progressed, an error of the training score may decrease continuously, whereas an error of the cross validation score may increase gradually. An optimal point may be detected by diagnosing the bias term and the variance terms using a training curve and a cross validation curve. Further, ensemble learning which increases an accuracy using various machine learning models, or decision tree learning which finally makes a decision by partitioning data according to rules may obtain better results when compared to a case of using a single machine learning model.

As described above, a consumed bandwidth predicted by the inference model of the machine learning inferrer 430 may be used to calculate a variable bandwidth for each class for a VBA in an SLA table included in the SLA manager 440, as expressed by Equation 5.

$$VBA_i=(E\{y_i\}+\sqrt{\text{Var}\{y_i\}}\times n)\times T \quad \text{[Equation 5]}$$

In this example, $VBA_i$ denotes an allocated bandwidth for the VBA, $E\{y_i\}$ denotes a quantity of traffic data predicted at a timepoint at which a consumed bandwidth is predicted, and $\text{Var}\{y_i\}$ denotes a variance value with respect to a prediction result and corresponds to a square of a standard deviation. In this example, n is an integer of 1, 2, 3, . . . , which is given to provide a margin to the consumed bandwidth by providing an integer multiple of the standard deviation. T denotes a cycle time.

FIGS. 10A through 10D illustrate results of predicting a consumed bandwidth using a machine learning model using a multiple linear regression model having an artificial neural network structure according to an example embodiment.

Figure 10A:
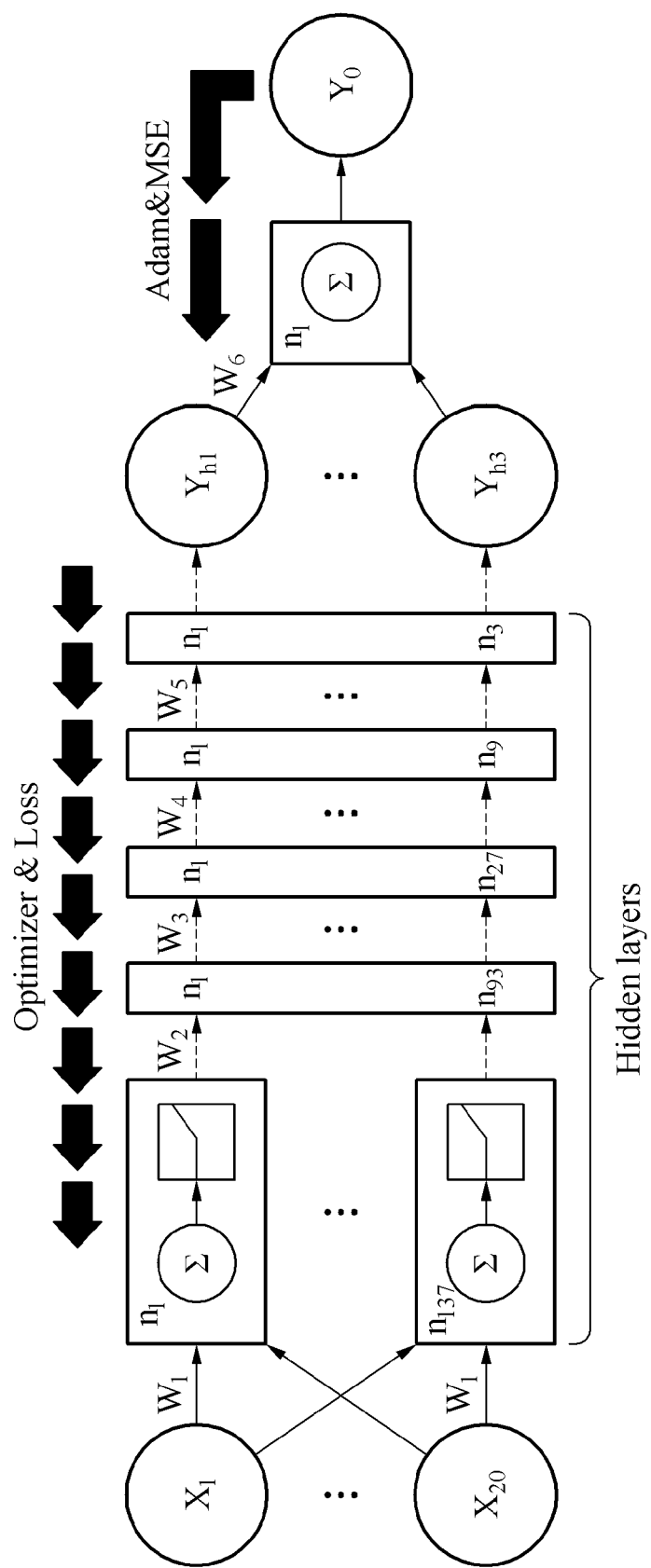
Figure 10C:
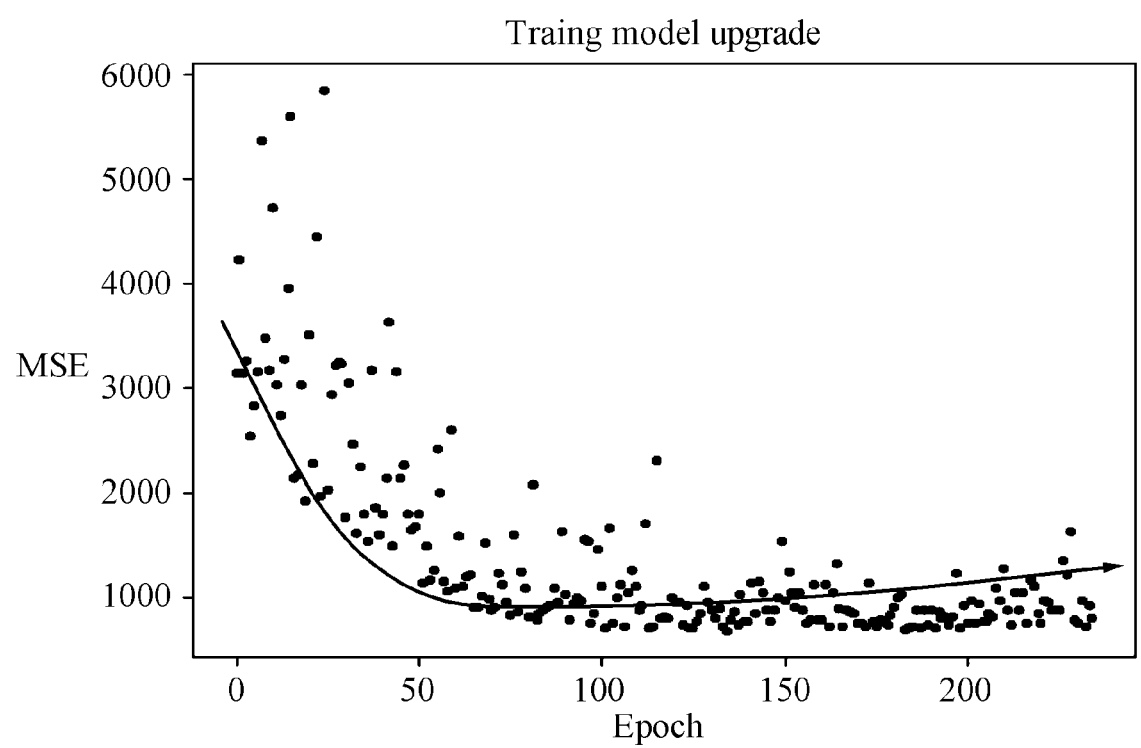
Figure 10D:
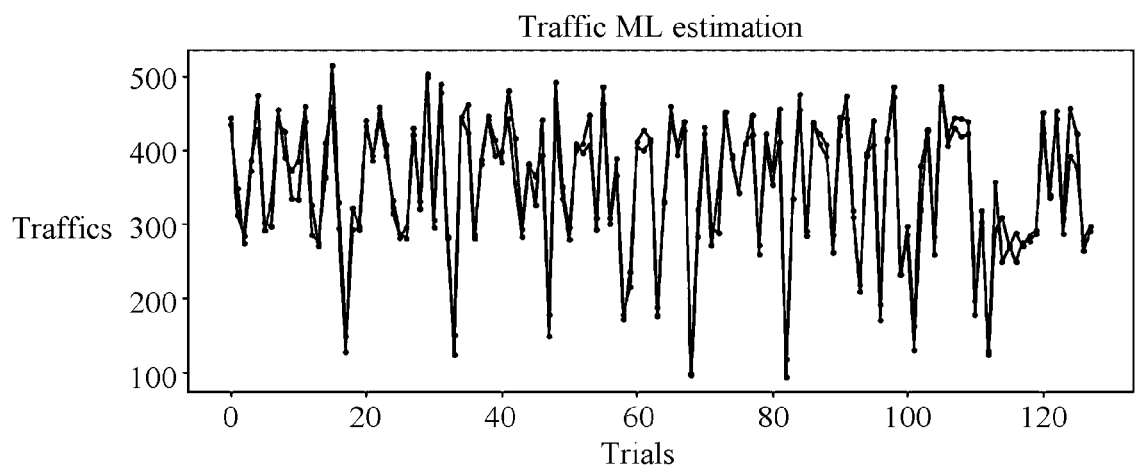

FIG. 10A illustrates a structure of a machine learning model using a multiple linear regression model having an artificial neural network structure. The machine learning model may have an error back-propagation structure and a multilayer perceptron including five hidden layers. FIG. 10B illustrates training data which is traffic aggregation data with respect to a time of 424 days in total. FIG. 10C shows an error of a test set with respect to a learning count. It may be verified that the error decreases based on the learning count; however, the error increases due to overfitting as the learning count excessively increases. FIG. 10D illustrates a result of predicting a consumed bandwidth with respect to a predetermined time using an inference model. A graph of the predicted value shows that a value is predicted almost approximate to an actual value but has an error, and thus the predicted value should be compensated using an average standard deviation.

FIG. 11 illustrates an example of a setting table of an SLA manager according to an example embodiment.

The SLA manager 440 may set information for a bandwidth allocation with respect to respective ONUs, as shown in FIG. 11. All the ONUs may have n queues constituting a service class. Each class may be set as a queue for managing the VBA or the DBA. It may be assumed that all ONUs each have a single service class, a service class Class 1 of an ONU1 is set as a class for managing the VBA, and services classes of the remaining ONUs are set as classes for managing the DBA. The SLA table may store an RTT, a service class, a bandwidth allocating method, and a credit for class for each ONU. In an example, a cycle time and a class variable credit for the service class for VBA of the ONU1 may be set, and a maximum class credit for the service classes for DBA of the remaining ONUs may be set.

In this example, the machine learning inferrer 430 may calculate the class variable credit with respect to Class 1 for VBA by inferring a variable bandwidth required periodically. In this example, the VBA may provide a cycle time to satisfy a packet latency characteristic required by a mobile network. The maximum class credit with respect to the classes from Class 2 to Class N for DBA may refer to a maximum available credit for each class. Even if an amount of buffer reported from an ONU is greater than the maximum available credit, the bandwidth allocator 460 may restrict a dynamic bandwidth to the set credit.

Figure 12:
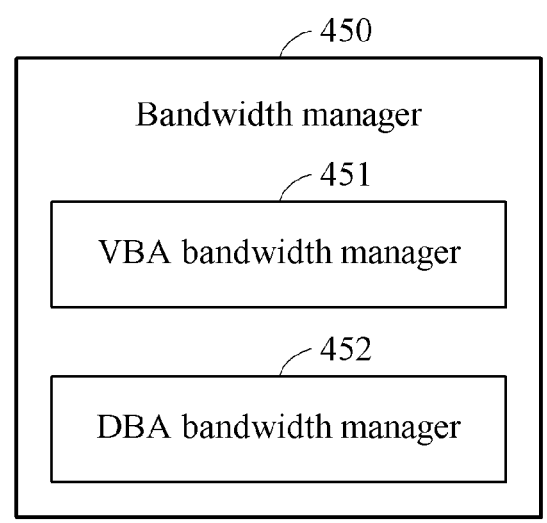
FIG. 12 is a block diagram illustrating a configuration of a bandwidth manager according to an example embodiment.

FIG. 12 is a block diagram illustrating a configuration of a bandwidth manager according to an example embodiment.

Referring to FIG. 12, the bandwidth manager 450 may include a VBA bandwidth manager 451 and a DBA bandwidth manager 452. The VBA bandwidth manager 451 may report a class variable credit with respect to a class for VBA to the bandwidth allocator 460 by referring to the SLA table included in the SLA manager 440 at every cycle time interval.

The DBA bandwidth manager 452 may store buffer status reports (BSRs) received from the ONUs, and sequentially report one by one to a DBA bandwidth allocator 462.

Figure 13:
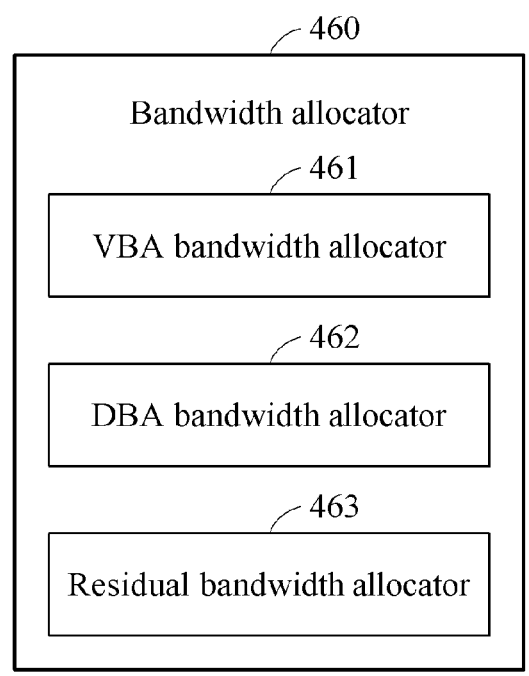
FIG. 13 is a block diagram illustrating a configuration of a bandwidth allocator according to an example embodiment.

FIG. 13 is a block diagram illustrating a configuration of a bandwidth allocator according to an example embodiment.

Referring to FIG. 13, the bandwidth allocator 460 may include a VBA bandwidth allocator 461, the DBA bandwidth allocator 462, and a residual bandwidth allocator 463. The VBA bandwidth allocator 461 may perform a VBA bandwidth calculation corresponding to a variable bandwidth reported from the VBA bandwidth manager 451 at a start timepoint of every cycle time.

When the VBA bandwidth allocator 461 completes the VBA bandwidth calculation, the residual bandwidth allocator 463 may perform a DBA bandwidth calculation with respect to a dynamic bandwidth which remains without being processed in a previous cycle period.

When the processing of the residual bandwidth allocator 463 is completed, the DBA bandwidth allocator 462 may allocate a dynamic bandwidth using the BSRs sequentially reported from the DBA bandwidth manager 452 with respect to the remaining transmission bandwidth. In this example, when it fails to process all the bandwidths reported from the DBA bandwidth manager 452 during the corresponding cycle time, the DBA bandwidth allocator 462 may partition a residual bandwidth and store the partitioned residual bandwidth in the residual bandwidth allocator 463 so as to be processed in a subsequent period.

Figure 14:
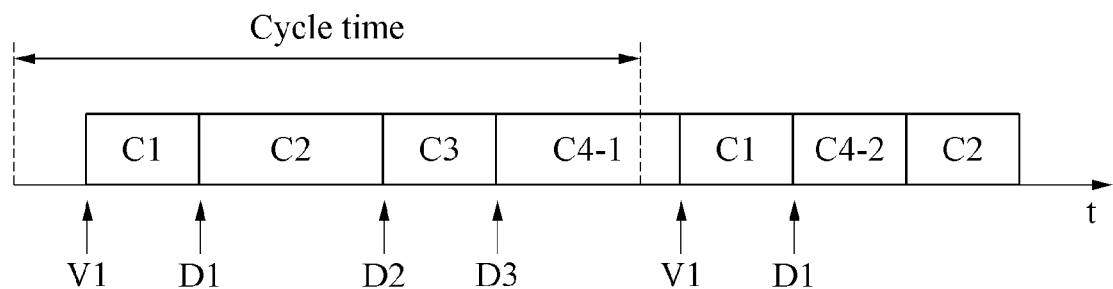
FIG. 14 illustrates examples of a variable bandwidth allocation (VBA) and a dynamic bandwidth allocation (DBA) according to an example embodiment.

FIG. 14 illustrates examples of a VBA and a DBA according to an example embodiment.

Referring to FIG. 14, detailed operations of a VBA and a DBA are shown. First, it may be assumed that BSRs with respect to Class 2, Class 3, and Class 4 are already received at a start timepoint of a cycle time. The bandwidth allocator 460 may first allocate a variable bandwidth with respect to Class 1. For example, the bandwidth allocator 460 may complete a calculation for bandwidth allocation with respect to Class 1 (C1) at a timepoint V1 and then, allocate a variable bandwidth corresponding thereto. In this example, a variable bandwidth according to VBA may be allocated first before a dynamic bandwidth according to DBA is allocated every cycle time. The variable bandwidth according to VBA may be determined by the class variable credit of the SLA table defined in the SLA manager 440.

At a timepoint D1 at which the allocation of the variable bandwidth according to VBA is terminated, the bandwidth allocator 460 may complete a calculation for bandwidth allocation with respect to Class 2 (C2) and then, allocate a dynamic bandwidth corresponding thereto. Similarly, at a timepoint D2 at which the allocation of the dynamic bandwidth with respect to Class 2 (C2) is terminated, the bandwidth allocator 460 may complete a calculation for bandwidth allocation with respect to Class 3 (C3) and then, allocate a dynamic bandwidth corresponding thereto. At a timepoint D3 at which the allocation of the dynamic bandwidth with respect to Class 3 (C3) is terminated, the bandwidth allocator 460 may complete a calculation for bandwidth allocation with respect to Class 4 (C4) and then, allocate a dynamic bandwidth corresponding thereto.

However, since a subsequent cycle time starts before the allocation of the dynamic bandwidth with respect to Class 4 is terminated, the bandwidth allocator 460 may allocate a dynamic bandwidth with respect to Class 4 (C4-1) up to a subsequent timepoint V1, and store the remaining Class 4 (C4-2) in the residual bandwidth allocator 463. When the subsequent cycle time starts, the bandwidth allocator 460 may first allocate a variable bandwidth according to VBA as in the precious cycle time, allocate the Class 4 (C4-2) stored in the residual bandwidth allocator 463, and perform the bandwidth allocation with respect to the Class 2 (C2).

According to the bandwidth allocating method described above, in a PON, an issue of the existing DBA scheme which may increase a network usage efficiency but may not provide a low-latency characteristic and an issue of the existing FBA scheme which may provide the low-latency characteristic but decrease the network usage efficiency greatly may be all solved. That is, the VBA scheme according to example embodiments may predict a consumed bandwidth based on machine learning and flexibly allocate the consumed bandwidth, thereby supporting the low-latency characteristic without reducing the network efficiency.

According to example embodiments, it is possible to generate an inference model to predict a consumed bandwidth required for transmission through machine learning by utilizing unstructured data and traffic data of a PON.

According to example embodiments, it is possible to perform a VBA with respect to a queue corresponding to a class requiring a low-latency service and perform a DBA with respect to a queue corresponding to a class not requiring the low-latency service using a transmission bandwidth which remains after the VBA is performed, thereby guaranteeing a low-latency requirement and increasing a network utilization rate.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A bandwidth allocating method performed by a bandwidth allocating apparatus included in an optical line terminal (OLT), the bandwidth allocating method comprising:
generating an inference model to predict a consumed bandwidth required for transmission by learning, using a plurality of machine learning models, unstructured data of a passive optical network (PON) including the OLT and traffic data corresponding to state information of the PON collected from the PON;
predicting the consumed bandwidth with respect to a queue corresponding to a class requiring a low-latency service among classes of optical network units (ONUS) connected to the OLT based on the generated inference model;
performing a variable bandwidth allocation (VBA) with respect to the queue corresponding to the class requiring the low-latency service among classes of the ONUS based on the predicted consumed bandwidth; and
performing a dynamic bandwidth allocation (DBA) with respect to a queue corresponding to a class not requiring the low-latency service among the classes of the ONUs using a transmission bandwidth which remains after the VBA is performed.

2. The bandwidth allocating method of claim 1, wherein the generating comprises:
learning training data using the machine learning models;
extracting a predetermined pattern using the learned training data; and
generating an inference model to predict the consumed bandwidth with respect to the queue of an ONU requiring the low-latency service among the ONUs connected to the OLT based on the extracted predetermined pattern.

3. The bandwidth allocating method of claim 1,
wherein the predicting comprises:
predicting traffic data with respect to a corresponding queue of an ONU requiring the low-latency service based on the generated inference model;
determining the consumed bandwidth with respect to the queue corresponding to the class requiring the low-latency service of the ONU based on a quantity of the predicted traffic data; and
calculating a prediction accuracy of the inference model through a cross validation with respect to the determined consumed bandwidth, and
wherein the generating comprises updating the inference model based on the calculated prediction accuracy.

4. The bandwidth allocating method of claim 1, further comprising:
calculating the variable bandwidth with respect to the queue corresponding to the class requiring the low-latency service based on the predicted consumed bandwidth.

5. The bandwidth allocating method of claim 4, wherein the performing of the VBA comprises allocating a transmission bandwidth with respect to the queue corresponding to the class requiring the low-latency service based on the calculated variable bandwidth such that a total of the transmission bandwidth allocated based on the calculated variable bandwidth is determined not to exceed a transmission bandwidth allocable according to a cycle time.

6. The bandwidth allocating method of claim 5, wherein the performing of the DBA comprises allocating the dynamic bandwidth with respect to the queue corresponding to the class not requiring the low-latency service based on report messages received from the ONUs, wherein the allocated dynamic bandwidth is determined based on the transmission bandwidth allocable according to the cycle time.

7. The bandwidth allocating method of claim 6,
wherein the performing of the DBA comprises, when the dynamic bandwidth determined with respect to one of queues to which the dynamic bandwidth is allocated through the DBA exceeds the bandwidth allocable according to the cycle time, dividing the determined dynamic bandwidth based on an end timepoint of the allocable bandwidth and determining a part of the dynamic bandwidth before the end timepoint to be a transmission bandwidth with respect to the one queue, and
wherein a residual part of the dynamic bandwidth after the end timepoint is processed in a bandwidth allocable according to a cycle time of a subsequent period.

8. A bandwidth allocating apparatus included in an optical line terminal (OLT), the bandwidth allocating apparatus comprising:
a machine learning inferrer configured to generate an inference model to predict a consumed bandwidth required for transmission by learning, using a plurality of machine learning models, unstructured data of a passive optical network (PON) including the OLT and traffic data corresponding to state information of the PON collected from the PON, and predict the consumed bandwidth with respect to a queue corresponding to a class requiring a low-latency service among classes of optical network units (ONUs) connected to the OLT based on the generated inference model; and a bandwidth allocator configured to perform a variable bandwidth allocation (VBA) with respect to a queue corresponding to a class requiring the low-latency service among classes of the ONUs based on the predicted consumed bandwidth, and perform a dynamic bandwidth allocation (DBA) with respect to a queue corresponding to a class not requiring the low-latency service among the classes of the ONUs using a transmission bandwidth which remains after the VBA is performed.

9. The bandwidth allocating apparatus of claim 8, wherein the machine learning inferrer is configured to learn training data using the machine learning models, extract a predetermined pattern using the learned training data, and generate an inference model to predict the consumed bandwidth with respect to the queue of an ONU requiring the low-latency service among the ONUS connected to the OLT based on the extracted predetermined pattern.

10. The bandwidth allocating apparatus of claim 8, wherein the machine learning inferrer is configured to predict traffic data with respect to the queue of the ONU requiring the low-latency service based on the generated inference model, determine the consumed bandwidth with respect to a queue corresponding to a class requiring the low-latency service of the ONU based on a quantity of the predicted traffic data, calculate a prediction accuracy of the inference model through a cross validation with respect to the determined consumed bandwidth, and update the inference model based on the calculated prediction accuracy.

11. The bandwidth allocating apparatus of claim 8, further comprising:
a service level agreement (SLA) manager configured to calculate the variable bandwidth with respect to the queue corresponding to the class requiring the low-latency service based on the predicted consumed bandwidth.

12. The bandwidth allocating apparatus of claim 11, wherein the bandwidth allocator is configured to allocate a transmission bandwidth with respect to the queue corresponding to the class requiring the low-latency service based on the calculated variable bandwidth such that a total of the transmission bandwidth allocated based on the calculated variable bandwidth is determined not to exceed a transmission bandwidth allocable according to a cycle time.

13. The bandwidth allocating apparatus of claim 12, wherein the bandwidth allocator is configured to allocate the dynamic bandwidth with respect to the queue corresponding to the class not requiring the low-latency service based on report messages received from the ONUs, wherein the allocated dynamic bandwidth is determined based on the transmission bandwidth allocable according to the cycle time.

14. The bandwidth allocating apparatus of claim 13, wherein the bandwidth allocator is configured to, when the dynamic bandwidth determined with respect to one of queues to which the dynamic bandwidth is allocated through the DBA exceeds the bandwidth allocable according to the cycle time, divide the determined dynamic bandwidth based on an end timepoint of the allocable bandwidth and determine a part of the dynamic bandwidth before the end timepoint to be a transmission bandwidth with respect to the one queue, and
wherein a residual part of the dynamic bandwidth after the end timepoint is processed in a bandwidth allocable according to a cycle time of a subsequent period.

15. A bandwidth allocating method performed by a bandwidth allocating apparatus of an optical network unit (ONU) connected to an optical line terminal (OLT), the bandwidth allocating method comprising:
storing uplink data for each of different queues for services having priorities;
transmitting a report message requesting a bandwidth allocation to the OLT based on the stored uplink data;
receiving a grant message including a transmission bandwidth allocated based on the transmitted report message; and
transmitting the stored uplink data based on the received grant message,
wherein the grant message includes a transmission bandwidth allocated by performing a variable bandwidth allocation (VBA) with respect to queues corresponding to a class requiring a low-latency service within a bandwidth allocable according to a cycle time, and performing a dynamic bandwidth allocation (DBA) with respect to queues corresponding to a class not requiring the low-latency service.

16. The bandwidth allocating method of claim 15, wherein the variable bandwidth is allocated through the VBA with respect to each of the queues corresponding to the class requiring the low-latency service such that a total of the allocated variable bandwidth is determined not to exceed a bandwidth allocable according to a cycle time.

17. The bandwidth allocating method of claim 15, wherein the dynamic bandwidth is allocated through the DBA with respect to each of the queues corresponding to the class not requiring the low-latency service, wherein the allocated dynamic bandwidth is determined based on the bandwidth allocable according to the cycle time.

18. The bandwidth allocating method of claim 17,
wherein, when the dynamic bandwidth determined with respect to one of queues to which the dynamic bandwidth is allocated through the DBA exceeds the bandwidth allocable according to the cycle time, the determined dynamic bandwidth is divided based on an end timepoint of the allocable bandwidth, and a part of the dynamic bandwidth before the end timepoint is determined to be a transmission bandwidth with respect to the one queue, and
wherein a residual part of the dynamic bandwidth after the end timepoint is processed in a bandwidth allocable according to a cycle time of a subsequent period.

* * * * *